United States Patent
Yamano et al.

(10) Patent No.: US 9,368,825 B2
(45) Date of Patent: Jun. 14, 2016

(54) FUEL CELL STACK

(71) Applicant: HONDA MOTOR CO., LTD., Minato-Ku, Tokyo (JP)

(72) Inventors: Naoki Yamano, Utsunomiya-Shi (JP); Seiji Sugiura, Utsunomiya-Shi (JP); Daisuke Wachi, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 298 days.

(21) Appl. No.: 14/046,073

(22) Filed: Oct. 4, 2013

(65) Prior Publication Data

US 2014/0106254 A1 Apr. 17, 2014

(30) Foreign Application Priority Data

Oct. 11, 2012 (JP) .................................. 2012-225720
Sep. 6, 2013 (JP) .................................. 2013-184873

(51) Int. Cl.
*H01M 8/24* (2016.01)
*H01M 8/02* (2016.01)
*H01M 8/10* (2016.01)

(52) U.S. Cl.
CPC .......... *H01M 8/2465* (2013.01); *H01M 8/0247* (2013.01); *H01M 8/241* (2013.01); *H01M 8/248* (2013.01); *H01M 8/0206* (2013.01); *H01M 8/0221* (2013.01); *H01M 8/0223* (2013.01); *H01M 2008/1095* (2013.01); *Y02E 60/50* (2013.01)

(58) Field of Classification Search
CPC . H01M 8/2465; H01M 8/248; H01M 8/0221; H01M 8/0206; Y02E 60/50
USPC ........................................................ 429/465
See application file for complete search history.

(56) References Cited

U.S. PATENT DOCUMENTS

| 2003/0003345 A1* | 1/2003 | Ohara ................ H01M 4/9083 429/437 |
|---|---|---|
| 2006/0024557 A1 | 2/2006 | Iritsuki et al. |
| 2006/0177722 A1 | 8/2006 | Inagaki |
| 2008/0268319 A1 | 10/2008 | Sakano et al. |
| 2008/0305368 A1 | 12/2008 | Takahashi et al. |
| 2012/0321980 A1 | 12/2012 | Goto et al. |

FOREIGN PATENT DOCUMENTS

| JP | 2003-203670 A | 7/2003 |
|---|---|---|
| JP | 2008-027761 A | 2/2008 |
| JP | 2010-123432 A | 6/2010 |

OTHER PUBLICATIONS

Search Report dated Feb. 20, 2014 issued over the corresponding German Patent Application No. 102013220278.4 with the English translation of pertinent portions.

* cited by examiner

*Primary Examiner* — Sarah A Slifka
*Assistant Examiner* — Haroon S Sheikh
(74) *Attorney, Agent, or Firm* — Carrier Blackman & Associates, P.C.; Joseph P. Carrier; William D. Blackman

(57) ABSTRACT

A unit cell of a fuel cell stack includes separators. Load receivers provided in the separators include projections, for example. The proximal ends of the projections are depressed to form inner curves. In the structure, sufficient flexibility of the projection is achieved. That is, when a force in a direction perpendicular to a stacking direction of fuel cell stack is applied to the projection, the projection is deformed in the direction perpendicular to the stacking direction.

5 Claims, 10 Drawing Sheets

FUEL CELL STACK

CROSS-REFERENCE TO RELATED APPLICATIONS

This application is based upon and claims the benefit of priority from Japanese Patent Applications No. 2012-225720 filed on Oct. 11, 2012 and No. 2013-184873 filed on Sep. 6, 2013, the contents all of which are incorporated herein by reference.

BACKGROUND OF THE INVENTION

1. Field of the Invention

The present invention relates to a fuel cell stack as a stack body formed by stacking a plurality of unit cells.

2. Description of the Related Art

A fuel cell includes a unit cell formed by sandwiching a membrane electrode assembly between a pair of separators. The membrane electrode assembly includes an anode, a cathode, and an electrolyte (e.g., solid polymer electrolyte membrane or oxide ion conductor) interposed between the anode and the cathode. Normally, a plurality of the unit cells are stacked together to form a fuel cell stack. In general, in the fuel cell stack, a tightening member is provided for applying a tightening load to components between a unit cell positioned at one end and a unit cell positioned at the other end for preventing detachment of any of the unit cells.

Impact loads from the outside may be applied to the fuel cell stack of this type. As described above, the tightening load is applied to the unit cells in the stacking direction by the tightening member. Therefore, the unit cells do not move easily in the stacking direction. However, as for directions perpendicular to the stacking direction (height and horizontal directions), since no tightening load is applied, the unit cells move easily.

As a possible approach to avoid such movement, a load receiver may be provided in the outer end of the separator to absorb the impact load by the load receiver. For example, in Japanese Laid-Open Patent Publication No. 2008-027761, the applicant of the present invention proposes structure in which a fuel cell stack is placed in a casing, and load receivers provided in predetermined separators protrude to contact the inner wall of the casing.

SUMMARY OF THE INVENTION

Ideally, separators of a fuel cell stack are overlapped in alignment with one another. However, in practice, positional displacement is inevitable, e.g., due to dimensional errors at the time of producing the separators and variation in positions of the stacked components at the time of assembling the fuel cell stack. In this case, positions of the load receivers are also displaced relatively from one another.

In this state, when an impact load is applied to the fuel cell stack, the impact load is concentrated on the load receiver having the largest positional displacement. As a consequence, the load receiver may be damaged undesirably.

A general object of the present invention is to provide a fuel cell stack in which even if positional displacement occurs in any of load receivers, since the load receivers tend to be placed in alignment with one another upon application of an impact load.

A main object of the present invention is to provide a fuel cell stack in which the impact load can be received by a plurality of the load receivers.

Another object of the present invention is to provide a fuel cell stack in which it is possible to eliminate the concern for damages of the load receivers.

In one embodiment according to the present invention, a fuel cell stack is formed by stacking a plurality of unit cells. Each of the unit cells includes an electrolyte electrode assembly and a pair of separators sandwiching the electrolyte electrode assembly. The electrolyte electrode assembly includes an anode, a cathode, and an electrolyte interposed between the anode and the cathode.

The separator includes a load receiver for receiving a load in a direction perpendicular to a stacking direction of the unit cells.

The load receiver is made of resin, and has a projection protruding from an outer end of the separator or a recess depressed from the outer end of the separator.

The load receiver is depressed to form an inner curve, and the inner curve of the load receiver provides flexibility in a direction perpendicular to the stacking direction.

In the case where positional displacement occurs between any of load receivers and the other load receivers due to variation in the positions of the stacked components, the load receiver having the positional displacement protrudes beyond the other load receivers. Therefore, when a force in a direction perpendicular to the stacking direction is applied to the load receivers, this force is applied firstly to the protruding load receiver.

In this regard, in the present invention, an inner curve is formed in the load receiver to provide sufficient flexibility of the load receiver. That is, when an external force such as an impact load is applied to any of load receivers, the load receiver to which the impact load is applied is deformed easily, and placed in alignment with the other load receivers.

In the structure, thereafter, the external force is received by a plurality of the load receivers that are placed in alignment with one another. Since the external force is distributed to the plurality of the load receivers, concentration of the external force on the single load receiver can be avoided. Therefore, it is possible to prevent damages of the load receivers.

Accordingly, in the present invention, since the load receiver has the inner curve, when an external force such as the impact load is applied to the load receiver, the load receiver is deformed easily. In the case where positional displacement occurs in any of load receivers, the load receiver having the positional displacement is deformed, and placed in alignment with the other load receivers.

As a result, the external force is distributed to a plurality of the load receivers. Therefore, since concentration of the external force on the single load receiver is avoided, it is possible to prevent damages of the load receivers.

It should be noted that a tightening member extending in the stacking direction to support the unit cells may be engaged with at least one of the projection and the recess of the load receiver. In the structure, it is possible to avoid detachment of the unit cells from the fuel cell stack.

Preferably, in the case where the load receiver has the projection, radius of curvature of the inner curve is large on a side adjacent to the separator, and small on a side away from the separator. In the structure, when a load is applied to the load receiver, stress concentration tends to occur in the load receiver, at a position spaced away from the separator. Thus, when excessive stress is applied to the load receiver, the damage occurs firstly from this position.

Since the damaged position is spaced away from the separator, exposure of the separator resulting from the damage of the load receiver can be avoided. Accordingly, it is possible to avoid formation of an electrically conductive channel through the separator, and thus, it is possible to maintain the desired insulating performance.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter a preferred embodiment of a fuel cell stack according to the present invention will be described in detail with reference to accompanying drawings.

Figure 1:
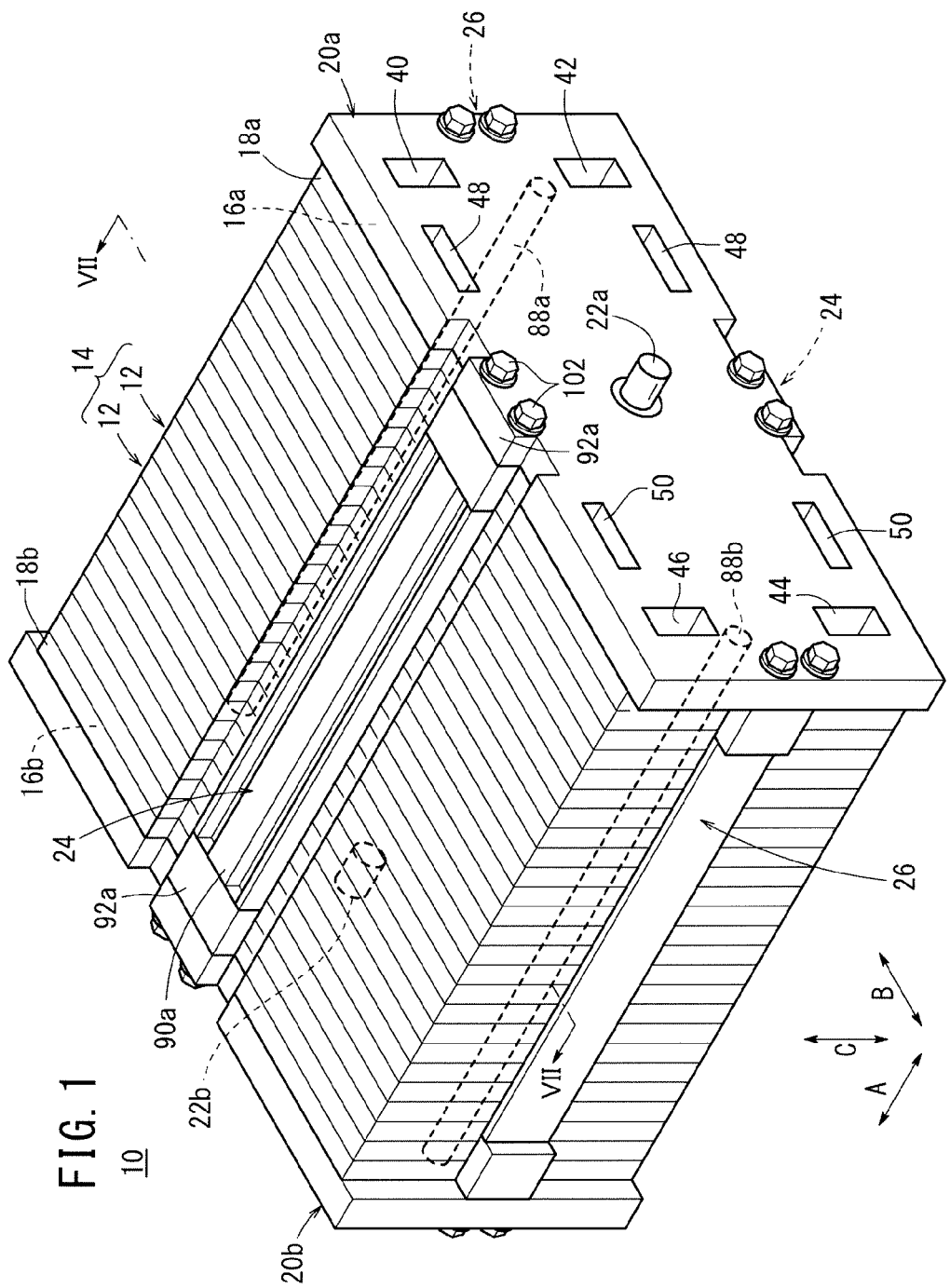
FIG. 1 is a perspective view schematically showing a fuel cell stack according to an embodiment of the present invention as a whole.
Figure 2:
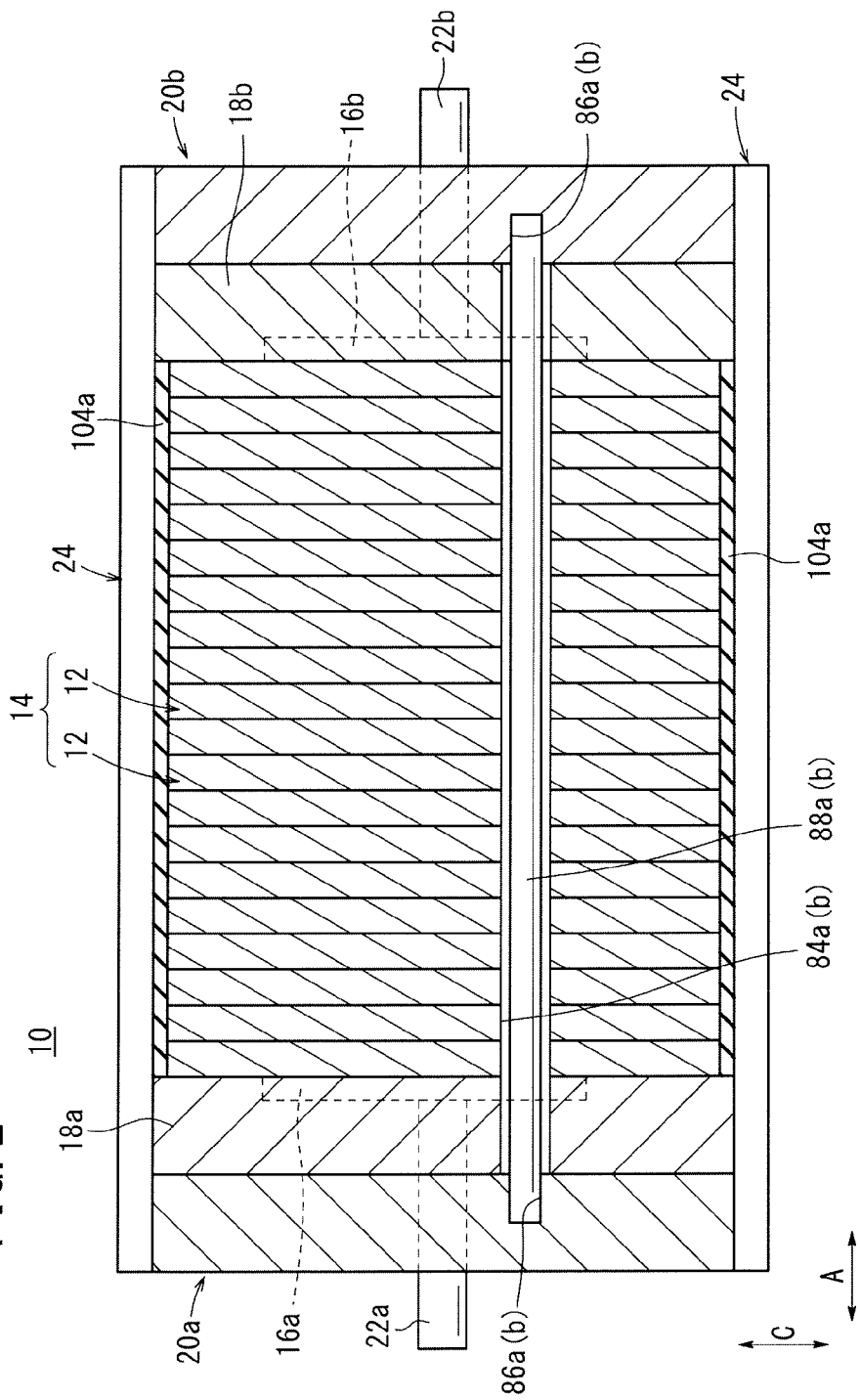
FIG. 2 is a partial cross sectional side view showing the fuel cell stack.

FIG. 1 is a perspective view schematically showing a fuel cell stack 10 according to an embodiment of the present invention, and FIG. 2 is a partial cross sectional side view showing the fuel cell stack 10. The fuel cell stack 10 is mounted in a vehicle body of an automobile (not shown), and used as a driving source for allowing the travel of the automobile. The width of the vehicle body of the automobile is indicated by an arrow A, the travel direction of the automobile is indicated by an arrow B, and the vertical direction is indicated by an arrow C.

As can be seen from FIGS. 1 and 2, the fuel cell stack 10 includes a stack body 14 formed by stacking a plurality of unit cells 12 in the direction indicated by the arrow A. At one end of the stack body 14 in the stacking direction, a first terminal plate 16a is provided. A first insulating plate 18a is provided outside the first terminal plate 16a, and a first end plate 20a is provided outside the first insulating plate 18a. Likewise, at the other end of the stack body 14 in the stacking direction, a second terminal plate 16b is provided. A second insulating plate 18b is provided outside the second terminal plate 16b, and a second end plate 20b is provided outside the second insulating plate 18b.

A first output terminal 22a connected to the first terminal plate 16a extends from a central portion of the first end plate 20a, and a second output terminal 22b connected to the second terminal plate 16b extends from a central portion of the second end plate 20b.

Each of the first end plate 20a and the second end plate 20b has a laterally elongated rectangular shape. First tightening members 24 are provided at substantially central portions of two long sides extending in the direction indicated by the arrow B. Further, second tightening members 26 are provided at substantially central portions of two short sides extending in the direction indicated by the arrow C.

Figure 3:
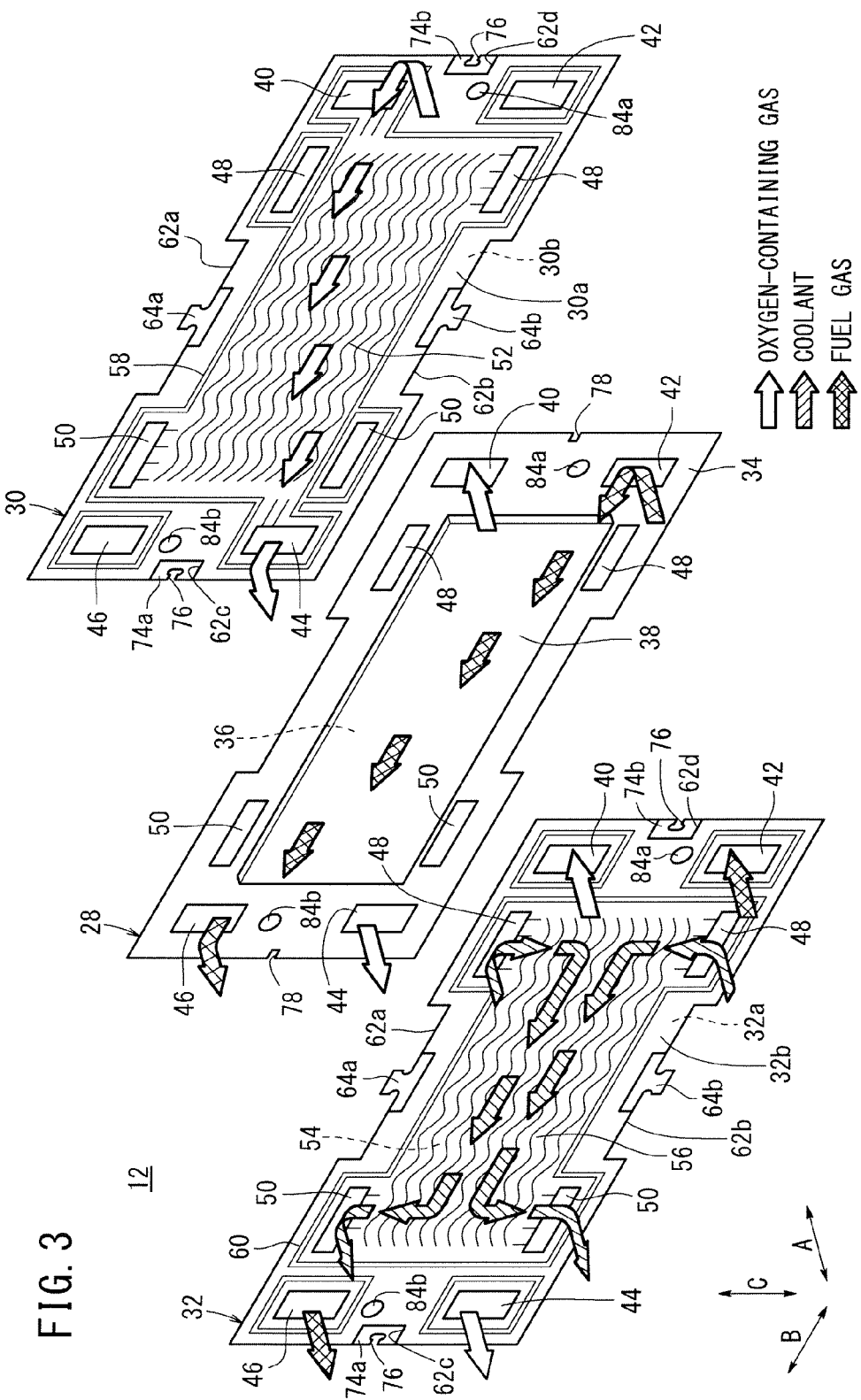
FIG. 3 is an exploded perspective view showing main components of a unit cell of the fuel cell stack.

As shown in FIG. 3, the unit cell 12 of the stack body 14 includes a membrane electrode assembly 28, and a first separator 30 and a second separator 32 sandwiching the membrane electrode assembly 28.

The membrane electrode assembly 28 includes a cathode 36, an anode 38, and a solid polymer electrolyte membrane (hereinafter simply referred to as the "electrolyte membrane") 34 interposed between the cathode 36 and the anode 38. For example, the solid polymer electrolyte membrane 34 is formed by impregnating a thin membrane of perfluorosulfonic acid with water, for example. That is, the fuel cell stack 10 is so called a solid polymer electrolyte fuel cell.

Each of the cathode 36 and the anode 38 has a gas diffusion layer (not shown) of a carbon paper or the like facing the first separator 30 or the second separator 32, and an electrode catalyst layer (not shown) interposed between each gas diffusion layer and the electrolyte membrane 34. The cathode 36 and the anode 38 having such structure are known, and the detailed description of the cathode 36 and the anode 38 is omitted.

For example, the first separator 30 and the second separator 32, sandwiching the membrane electrode assembly 28 as described above, include separator main bodies 30m, 32m which are made of metal plates such as steel plates, stainless steel plates, aluminum plates, plated steel sheets, or metal plates having anti-corrosive surfaces by surface treatment. It should be noted that the respective main bodies 30m, 32m of the first separator 30 and the second separator 32 may be made of carbon.

At one end of the unit cell 12 in the longitudinal direction indicated by the arrow B, an oxygen-containing gas supply passage 40 for supplying an oxygen-containing gas and a fuel gas supply passage 42 for supplying a fuel gas are provided. The oxygen-containing gas supply passage 40 and the fuel gas supply passage 42 extend through the unit cell 12 in the direction indicated by the arrow A. Further, at the other end of the unit cell 12, a fuel gas discharge passage 46 for discharging the fuel gas and an oxygen-containing gas discharge passage 44 for discharging the oxygen-containing gas are provided. The fuel gas discharge passage 46 and the oxygen-containing gas discharge passage 44 extend through the unit cell 12 in the direction indicated by the arrow A.

At both ends of the unit cell 12 in the lateral direction indicated by the arrow C, two coolant supply passages 48 for supplying a coolant are provided oppositely on one side adjacent to the oxygen-containing gas supply passage 40 and the fuel gas supply passage 42. Further, at both ends of the unit cell 12 in the lateral direction, two coolant discharge passages 50 for discharging the coolant are provided oppositely on the other side adjacent to the fuel gas discharge passage 46 and the oxygen-containing gas discharge passage 44. The coolant supply passages 48 and the coolant discharge passages 50 extend through the unit cell 12 in the direction indicated by the arrow A.

Further, an oxygen-containing gas flow field 52 connected to the oxygen-containing gas supply passage 40 and the oxygen-containing gas discharge passage 44 is formed on an end surface 30a of the first separator 30 facing the membrane electrode assembly 28. The oxygen-containing gas flow field 52 extends in the direction indicated by the arrow B.

Further, a fuel gas flow field 54 connected to the fuel gas supply passage 42 and the fuel gas discharge passage 46 is formed on an end surface 32a of the second separator 32 facing the membrane electrode assembly 28. The fuel gas flow field 54 extends in the direction indicated by the arrow B.

The first separator 30 and the second separator 32 is formed by corrugating a metal thin plate having a rectangular surface by pressure forming to have a corrugated shape in cross section. This corrugation forms the oxygen-containing gas flow field 52 or the fuel gas flow field 54 in a wavy form.

Further, a coolant flow field 56 connected to the coolant supply passages 48 and the coolant discharge passages 50 are formed between an end surface 32b of the second separator 32 and an adjacent end surface 30b of the first separator 30. The coolant can flow through the coolant flow field 56 over the range where the anode 38 or the cathode 36 is provided.

As the oxygen-containing gas, for example, air is adopted. As the fuel gas, for example, hydrogen or a hydrogen containing gas is adopted. Further, as the coolant, for example, water, organic solvent, or oil is used.

A first seal member 58 is formed integrally with the end surfaces 30a, 30b of the first separator 30, around the outer end of the first separator 30. A second seal member 60 is formed integrally with the end surfaces 32a, 32b of the second separator 32, around the outer end of the second separator 32. Each of the first seal member 58 and the second seal members 60 is made of seal material, cushion material, or packing material such as an EPDM (ethylene propylene diene monomer) rubber, an NBR (acrylonitrile butadiene) rubber, a fluorine compound rubber, a silicone rubber, a fluorosilicone rubber, a butyl rubber, a natural rubber, a styrene rubber, a chloroprene rubber, or an acrylic rubber.

Cutout portions 62a, 62b are formed in two long sides of the first separator 30 and the second separator 32, respectively. The cutout portions 62a, 62b are elongated in the direction indicated by the arrow B. Projecting load receivers 64a, 64b are provided at substantially central positions of the cutout portions 62a, 62b in the direction indicated by the arrow B.

Figure 4:
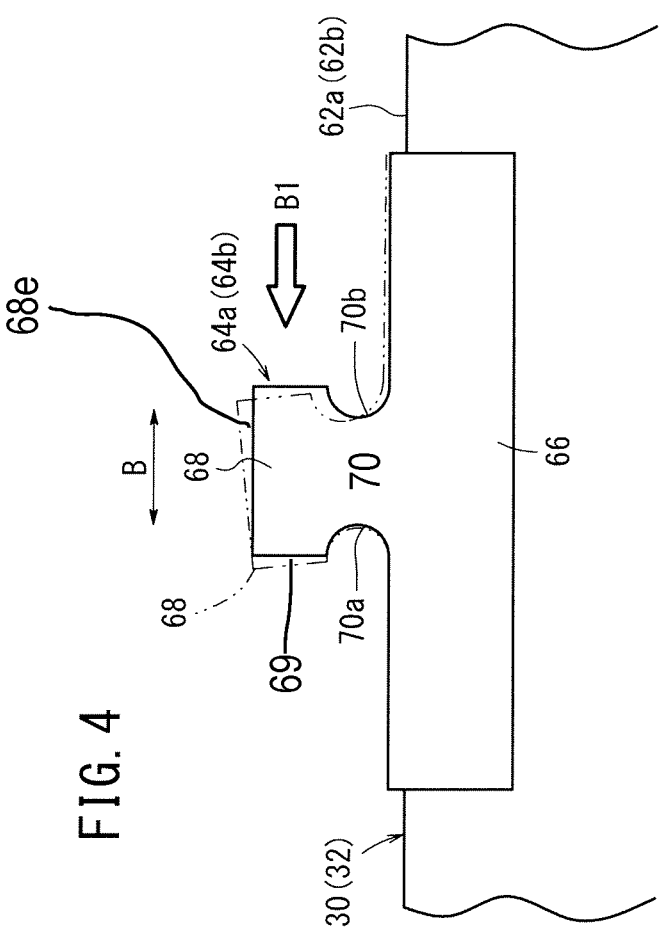
FIG. 4 is an enlarged front view showing main components by enlarging a projecting load receiver.

The projecting load receivers 64a, 64b are, e.g., made of resin material, and attached to the first separator 30 and the second separator 32. That is, as shown in FIG. 4 where main components are enlarged, the projecting load receiver 64a includes a rectangular clip portion 66, and the cutout portion 62a is partially inserted under pressure into, and joined to an insertion groove (not shown) formed in a lower end surface of the clip portion 66.

The projecting load receiver 64a includes a projection 68 integrally attached to, and protruding from a central part of the clip portion 66, as shown. The projection 68 is narrower than the clip portion 66, and the load receiver 64a is attached to the separator main body 32m at the cutout portion 62a. The projection 68 includes an outer portion (head) 69 having a first diameter and including a horizontal top edge 68e which may extend slightly beyond the end surfaces of the long sides of the first separator 30 and the second separator 32 (where the cutout portions 62a, 62b are not present).

Further, the projection 68 also includes an intermediate, or "neck" portion 70 interconnecting the outer, head portion 69 and the clip portion 66. The intermediate neck portion 70 has a second diameter at its narrowest part, which is smaller than the first diameter of the outer portion. The intermediate neck portion also has two first inner curves 70a, 70b formed at the sides thereof and depressed in the direction indicated by the arrow B in a semi-circular shape and formed adjacent to a proximal end of the projection 68. This reduced-diameter intermediate neck portion permits significant bending of the projection 68, as shown by the dotted-line outline in FIG. 4, to accommodate small amounts of imperfect alignment of adjacent separators 30, 32, as needed. Since the first inner curves 70a, 70b are present, the rigidity of the intermediate portion 70 of the projection 68 is small in comparison with the case where the first inner curves 70a, 70b are not present in the projection 68. Stated otherwise, the flexibility of the projection 68 is large, and the projection 68 is deformed easily when an external force (impact load) in the direction indicated by an arrow B1 is applied to the projection 68, as shown by a virtual line (two-dot chain line).

The projecting load receiver 64b has the same structure as the projecting load receiver 64a. Therefore, the constituent elements of the projecting load receiver 64b that are identical to those of the projecting load receiver 64a are labeled with the same reference numerals, and descriptions thereof will be omitted. The projecting load receivers 64a, 64b may be provided at diagonal positions of the first separator 30 and the second separator 32.

Figure 7:
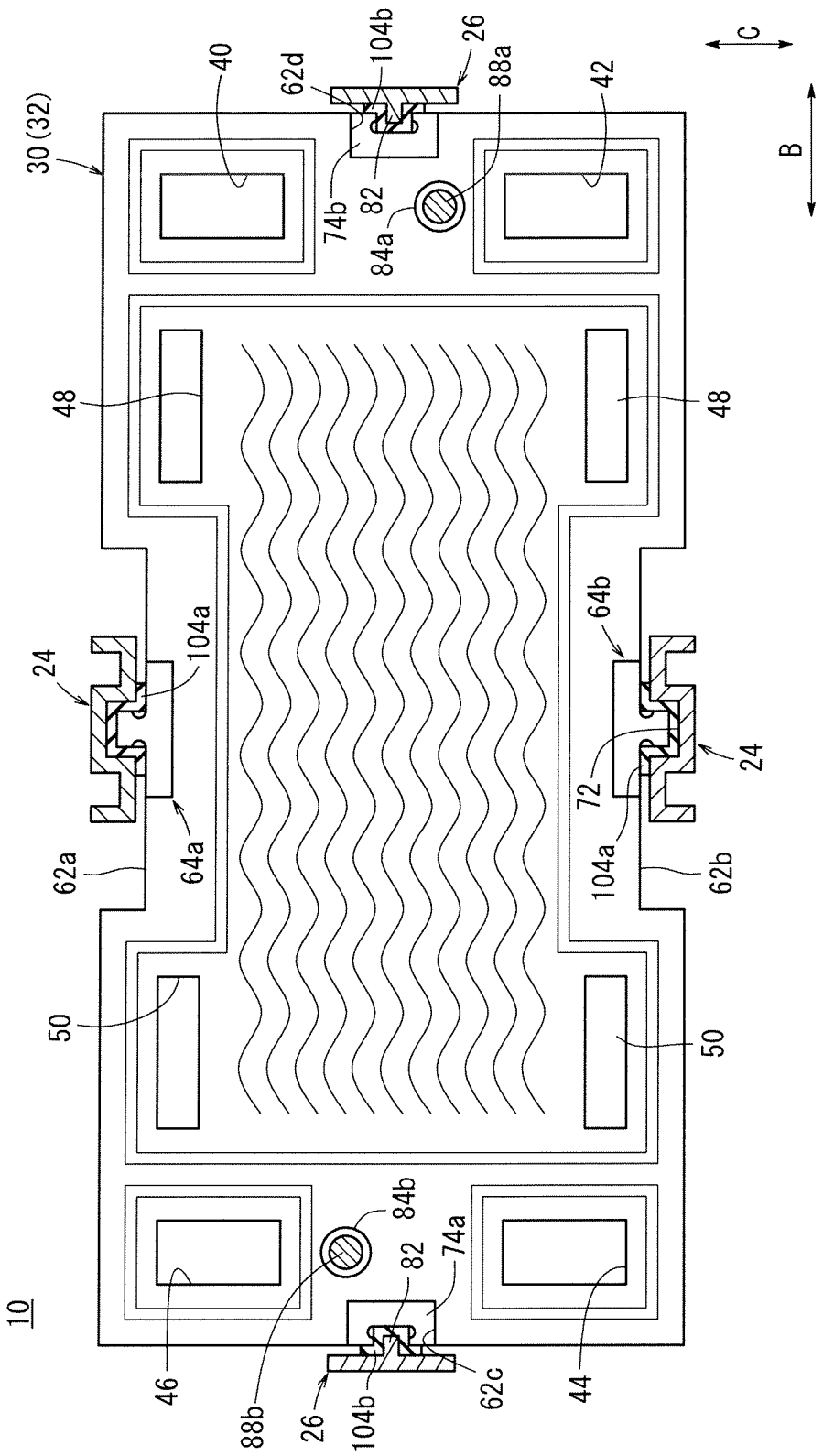
FIG. 7 is a cross sectional view taken along a line VII-VII in FIG. 1.

The projecting load receivers 64a, 64b are arranged in the stacking direction, and a plurality of the projecting load receivers 64a are jointly, and a plurality of the projecting load receivers 64b are jointly engaged with recessed engagement sections 72 of the respective first tightening members 24 (see FIG. 7).

Short cutout portions 62c, 62d extending in the direction indicated by the arrow C are formed at substantially central positions of both of left and right ends of the two short sides of the first separator 30 and the second separator 32 (see FIG. 3). Recessed load receivers 74a, 74b are inserted under pressure into, and joined to these cutout portions 62c, 62d. That is, the recessed load receiver 74b is provided between the oxygen-containing gas supply passage 40 and the fuel gas supply passage 42, and the recessed load receiver 74a is provided between the oxygen-containing gas discharge passage 44 and the fuel gas discharge passage 46. The ends of the recessed load receivers 74a, 74b in the direction indicated by the arrow B protrude slightly beyond the end surfaces of the short sides of the first separator 30 and the second separator 32.

The recessed load receivers 74a, 74b also include respective clip portions 71, which are respectively attached to the main bodies 30m, 32m of the corresponding separators 30, 32 in a manner similar to that described above in connection with the clip portions 66 of the projecting load receivers 64a, 64b, and are also made of resin material as in the case of the projecting load receivers 64a, 64b. The recessed load receivers 74a, 74b are depressed inwardly at ends in the direction indicated by the arrow B to have first recesses 76, which define first and second flange portions 73, 75 extending outwardly from the clip portion 71 at opposite sides of the first recesses 76, as shown. It should be noted that the electrolyte membrane 34 is also depressed to have second recesses 78, at positions corresponding to the first recesses 76.

Figure 5:
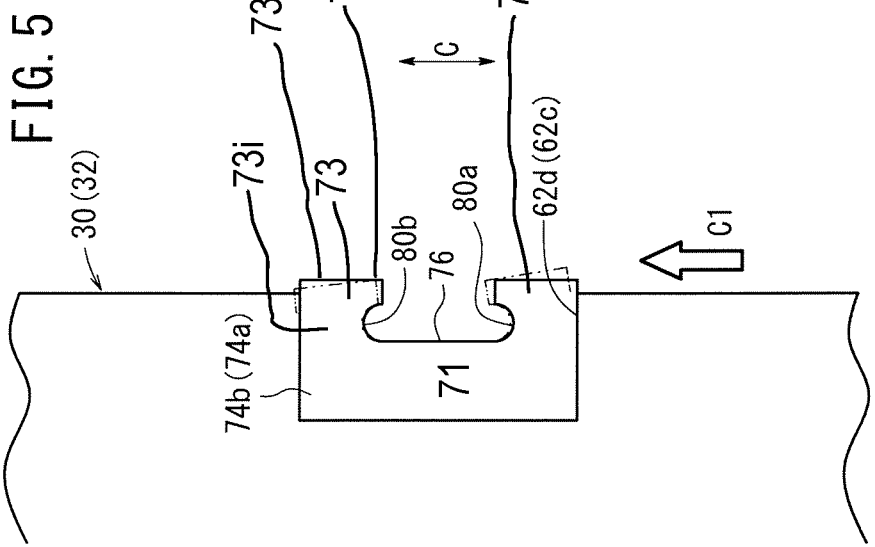
FIG. 5 is an enlarged front view showing main components by enlarging a recessed load receiver.

As shown in FIG. 5 where main components are enlarged, each of the flange portions 73, 75 adjacent the first recess 76 is depressed in a semi-circular shape to have two second inner curves 80a, 80b formed in the direction indicated by the arrow C. The flange portions 73, 75 are substantially mirror images of one another, as shown, so only the detailed structure of the upper flange portion 73 will be described herein, with the understanding that the lower flange portion 75 is formed with a substantially similar structure. The upper flange portion 73 includes an outer portion (head) 73h having a first diameter and including a substantially flattened outer edge 73e. Further, the upper flange portion 73 also includes an intermediate, or "neck" portion 73i interconnecting the outer, head portion 73h and the clip portion 71. The intermediate neck portion 73i has a second diameter at its narrowest part at a central portion of the inner curve 80b, which is smaller than the first diameter of the outer portion. The intermediate neck portion 73i also has the inner curve 80b formed at the side thereof and depressed to form a semi-circular shape adjacent to a proximal end of the upper flange portion 73. This reduced-diameter intermediate neck portion permits significant bending of the upper flange portion 73, as shown by the dotted-line outline in FIG. 5, to accommodate small amounts of imperfect alignment of adjacent separators 30, 32, as needed. Since the second inner curves 80a, 80b are present, the rigidity of the recessed load receivers 74a, 74b is small in comparison with the case where the second inner curves 80a, 80b are not formed. That is, the flexibility of the recessed load receivers 74a, 74b is large, and the recessed load receivers 74a, 74b are deformed easily when an external force (impact load) in the direction indicated by the arrow C1 is applied to the ends of the recessed load receivers 74a, 74b, as shown by a virtual line in FIG. 5.

The recessed load receivers 74a are arranged to have the same height in the stacking direction, and the recessed load receivers 74b are arranged to have the same height in the stacking direction. As described later, the recessed load receivers 74a and the recessed load receivers 74b are fitted to projecting engagement sections 82 of the second tightening members 26 (see FIG. 7). The recessed load receivers 74a, 74b may be provided at respective diagonal positions of the first separator 30 and the second separator 32.

Figure 6:
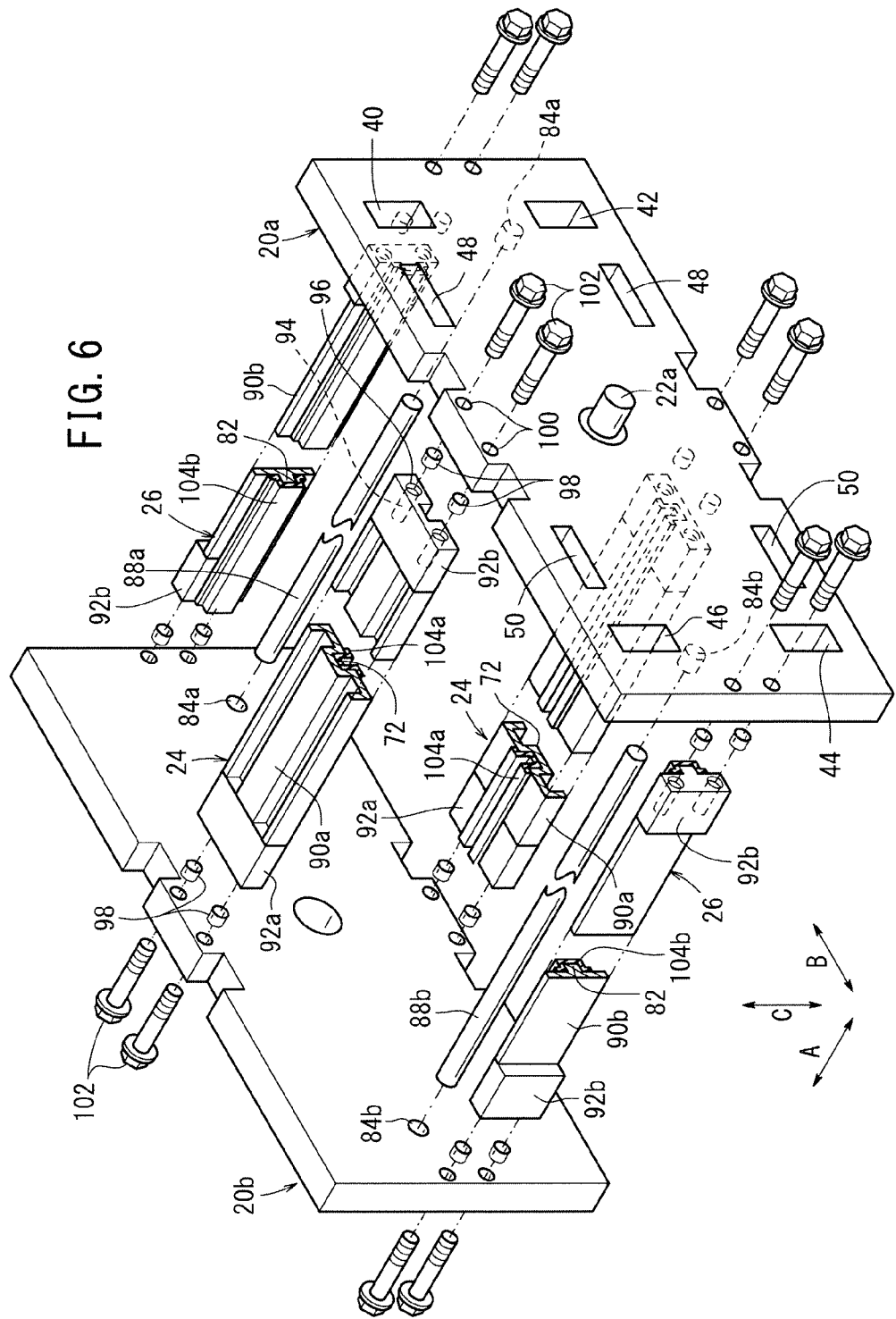
FIG. 6 is an exploded perspective view showing end plates, first tightening members, and second tightening members of the fuel cell stack.

Positioning holes 84a, 84b are provided at one of pairs of diagonal positions of the unit cells 12, specifically, adjacent to an upper position of the fuel gas supply passage 42 and adjacent to an upper position of the oxygen-containing gas discharge passage 44. As shown in FIGS. 2 and 6, holes 86a, 86b are formed in the first end plate 20a and the second end plate 20b, coaxially with the positioning holes 84a, 84b.

Both ends of the positioning pin 88a having a columnar shape extending in the stacking direction are fitted into the holes 86a without any clearance, and both ends of the positioning pin 88b are fitted to the other holes 86b without any clearance. The positioning pins 88a, 88b are inserted into the positioning holes 84a, 84b with clearance. Preferably, the positioning pins 88a, 88b are made of SUS (stainless steel), aluminum, iron, resin such as PPS (Polyphenylenesulfide), carbon or the like.

As shown in FIG. 6, each of the first tightening members 24 includes a plate shaped section 90a formed by extrusion, and attachment sections 92a fixed to both longitudinal ends of the plate shaped section 90a. For example, the plate shaped section 90a and the attachment sections 92a are welded together into one piece, or formed into one piece by cutting.

As shown in FIGS. 6 and 7, the plate shaped section 90a has a corrugated shape in cross section, and includes a recessed engagement section 72. The recessed engagement section 72 is engaged with the projecting load receivers 64a (64b) of the unit cells 12, and extends in the stacking direction. The outer surface of the first tightening member 24 is positioned inside the outer surface of the long side of the unit cells 12. The plate shaped section 90a has recesses in the outer surface on both sides to achieve weight reduction. It should be noted that the recesses may not be formed so as to increase the bending strength of the plate shaped section 90a.

The attachment section 92a is thicker than the plate shaped section 90a, and two screw holes 94 and two positioning holes 96 are formed coaxially in the end surface of the attachment section 92a facing the first end plate 20a and the second end plate 20b (see FIG. 6). Positioning rings 98 are fitted to the positioning holes 96. Further, the positioning rings 98 are fitted to two holes 100 described later.

The two holes 100 are formed at central positions of each of the long sides of the first end plate 20a and the second end plate 20b. Bolts 102 are inserted into the holes 100 and the positioning rings 98. Front ends of the bolts 102 are screwed to the screw holes 94.

Each of the second tightening members 26 includes a plate shaped section 90b formed by extrusion, and attachment sections 92b fixed to both longitudinal ends of the plate shaped section 90b. For example, the plate shaped section 90b and the attachment sections 92b are welded together into one piece, or formed into one piece by cutting.

As shown in FIGS. 6 and 7, the plate shaped section 90b has the projecting engagement section 82 extending in the stacking direction on a side surface facing the unit cells 12. The projecting engagement section 82 is engaged with the recessed load receivers 74a (74b) of the unit cells 12. On the outside of the stacked components, the thickness of the second tightening member 26 is reduced as much as possible.

The attachment section 92b has the same structure as the attachment section 92a of the first tightening member 24 as described above. Therefore, the constituent elements of the attachment section 92b that are identical to those of the attachment section 92a of the first tightening member 24 are labeled with the same reference numerals, and descriptions thereof will be omitted.

Cushioning members 104a extending in the stacking direction are provided between the first tightening members 24 and the outer surface of the stack body 14, and cushioning members 104b extending in the stacking direction are provided between the second tightening members 26 and the outer surface of the stack body 14. The cushioning members 104a, 104b may be made of resilient material, such as epoxy resin. Alternatively, the cushioning members 104a, 104b may be made of the same material as the first seal member 58 and the second seal member 60, such as silicone rubber. Further, material having heat resistance, weather resistance, chemical resistance, e.g., a formed rubber chiefly containing EPDM may be used for the cushioning members 104a, 104b.

The first tightening member 24 and the outer surface of the stack body 14 have a corrugated section including the recessed engagement section 72 and the projection 68 of the projecting load receiver 64a (64b), which are engaged with each other. The cushioning member 104a is filled onto, or adhered onto the corrugated section without any clearance. A flange section is formed integrally with the cushioning member 104a, at both ends of a portion having a U-shape in cross section between the recessed engagement section 72 and the projecting load receiver 64a (64b). The flange section is provided along a flat surface of the cutout portion 62a extending in a horizontal direction. The cushioning member 104a may be made of filling material. Alternatively, a plate shaped member may be used as the cushioning member 104a.

The second tightening member 26 and the outer surface of the stack body 14 have a corrugated section including the projecting engagement section 82 and the first recess 76 of the recessed load receiver 74a (74b) and the second recess 78 of the electrolyte membrane 34. The cushioning member 104b is filled onto, or adhered onto the corrugated section without any clearance. A flange section is formed integrally with the cushioning member 104b, at both ends of a portion having a U-shape in cross section between the projecting engagement section 82 and the first recess 76 and the second recess 78. The flange section is provided along a flat surface of the plate shaped section 90b extending in the vertical direction.

In the embodiment of the present invention, the total modulus of elasticity ST1 of the positioning pins 88a, 88b is larger than the modulus of elasticity ST2 of the single cushioning member 104a, and the modulus of elasticity ST2 of the single cushioning member 104a is larger than the modulus of elasticity ST3 of the single first tightening member 24 (ST1>ST2>ST3). Likewise the total modulus of elasticity ST1 of the positioning pins 88a, 88b is larger than the modulus of elasticity ST2 of the single cushioning member 104b, and the modulus of elasticity ST2 of the single cushioning member 104b is larger than the modulus of elasticity ST3 of the single second tightening member 26 (ST1>ST2>ST3).

As shown in FIG. 1, the oxygen-containing gas supply passage 40, the fuel gas supply passage 42, the oxygen-containing gas discharge passage 44, the fuel gas discharge passage 46, the coolant supply passages 48, and the coolant discharge passages 50 are formed in the first end plate 20a. Manifold members (not shown) are connected to the oxygen-containing gas supply passage 40, the fuel gas supply passage 42, the oxygen-containing gas discharge passage 44, the fuel gas discharge passage 46, the coolant supply passages 48, and the coolant discharge passages 50.

Alternatively, the oxygen-containing gas supply passage 40, the fuel gas supply passage 42, the oxygen-containing gas discharge passage 44, and the fuel gas discharge passage 46, may be formed in the first end plate 20a, and the coolant supply passages 48 and the coolant discharge passages 50 may be formed in the second end plate 20b.

The fuel cell stack 10 according to the embodiment of the present invention basically has the structure as described above. Next, operation and advantages of the fuel cell stack 10 will be described in conjunction with its operation.

For operation of the fuel cell stack 10, firstly, as shown in FIG. 1, at the first end plate 20a, a fuel gas is supplied to the fuel gas supply passage 42, and an oxygen-containing gas is supplied to the oxygen-containing gas supply passage 40. Further, further, a coolant such as pure water, ethylene glycol, or oil is supplied to the pair of the coolant supply passages 48.

As shown in FIG. 3, the fuel gas is supplied from the fuel gas supply passage 42 to the fuel gas flow field 54 of the second separator 32. The fuel gas moves along the fuel gas flow field 54 in the direction indicated by the arrow B, and the fuel gas is supplied to the anode 38 of the membrane electrode assembly 28.

At the anode 38, hydrogen in the fuel gas is ionized to induce a reaction of producing protons. By proton conductive function of the electrolyte membrane 34, the protons move toward the cathode 36. Further, electrons are used as an electrical energy source for driving an external load electrically connected to the fuel cell stack 10.

The oxygen-containing gas flows from the oxygen-containing gas supply passage 40 into the oxygen-containing gas flow field 52 of the first separator 30. The oxygen-containing gas flows along the oxygen-containing gas flow field 52 in the direction indicated by the arrow B, and the oxygen-containing gas is supplied to the cathode 36 of the membrane electrode assembly 28.

At the cathode 36, oxygen in the oxygen-containing gas and the protons which have moved through the electrolyte membrane 34 and the electrons which have arrived at the cathode 36 after driving the external load induce reaction of producing water.

As described above, in the membrane electrode assembly 28, the fuel gas supplied to the anode 38 and the oxygen-containing gas supplied to the cathode 36 are partially consumed in the electrochemical reactions for generating electricity.

The fuel gas partially consumed at the anode 38 is discharged along the fuel gas discharge passage 46 in the direction indicated by the arrow A. Further, the oxygen-containing gas partially consumed at the cathode 36 is discharged along the oxygen-containing gas discharge passage 44 in the direction indicated by the arrow A.

Further, the coolant supplied to the pair of coolant supply passages 48 flows into the coolant flow field 56 between the first separator 30 and the second separator 32. After the coolant temporarily flows inward in the direction indicated by the arrow C, the coolant moves in the direction indicated by the arrow B for cooling the membrane electrode assembly 28. After the coolant moves outward in the direction indicated by the arrow C, the coolant moves along the pair of coolant discharge passages 50, and the coolant is discharged in the direction indicated by the arrow A.

During power generation operation as described above, impact loads may be applied to the fuel cell stack 10 from the outside, and the impact loads may include force components applied in the direction indicated by the arrow B1 or the direction indicated by the arrow C1, i.e., in a direction perpendicular to the stacking direction indicated by the arrow A.

Figure 8:
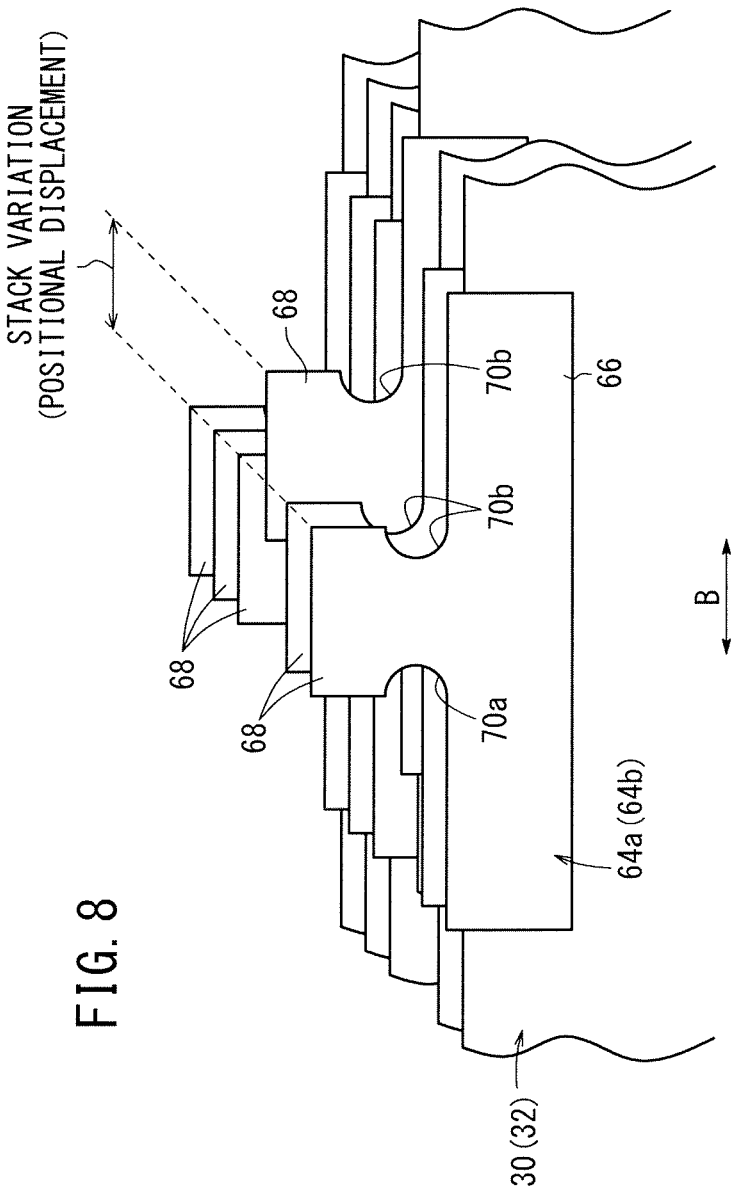
FIG. 8 is an enlarged perspective view showing main components by emphasizing positional displacement between projecting load receivers.

For example, positional displacement of any of the projecting load receivers 64a (64b) relative to the other projecting load receivers 64a (64b) may occur, e.g., due to dimensional errors at the time of producing the first separator 30 and the second separator 32, or variation in the positions of the stacked components at the time of assembling the fuel cell stack 10. That is, as shown in FIG. 8, the projection 68 of the projecting load receiver 64a (64b) having the positional displacement protrudes beyond the projections 68 of the other projecting load receivers 64a (64b). In FIG. 8, for ease of understanding, the protruding degree is emphasized.

In this state, assuming that an impact load is applied to the first tightening member 24, and as a result, the first tightening member 24 moves in the direction indicated by the arrow B1, the force in the direction indicated by the arrow B1 is firstly applied only to the projection 68 of the projecting load receiver 64a (64b) which protrudes beyond the other projecting load receivers 64a (64b). Stated otherwise, the force is locally concentrated on this projection 68. Therefore, if the rigidity of the projection 68 is large and the projection 68 is not deformed significantly, the projecting load receiver 64a (64b) subjected to concentration of the force may be damaged undesirably.

However, in an attempt to address the problem, as shown in FIG. 4, the first inner curves 70a, 70b are formed adjacent to the proximal end of the projection 68 to provide sufficient flexibility of the projection 68. Therefore, as shown by the virtual line in FIG. 4, the projection 68 to which the force is applied firstly is deformed easily. As a result, this projection 68 is placed in alignment with the other projections 68.

Therefore, thereafter, the force is received by a plurality of the projections 68 that are placed in alignment with one another. Thus, the force is not concentrated on the single projection 68, but distributed. Since the force applied to each of the projections 68 becomes less than the withstand load of the projecting load receiver 64a (64b), it becomes possible to avoid damages of the projecting load receivers 64a (64b).

Figure 9:
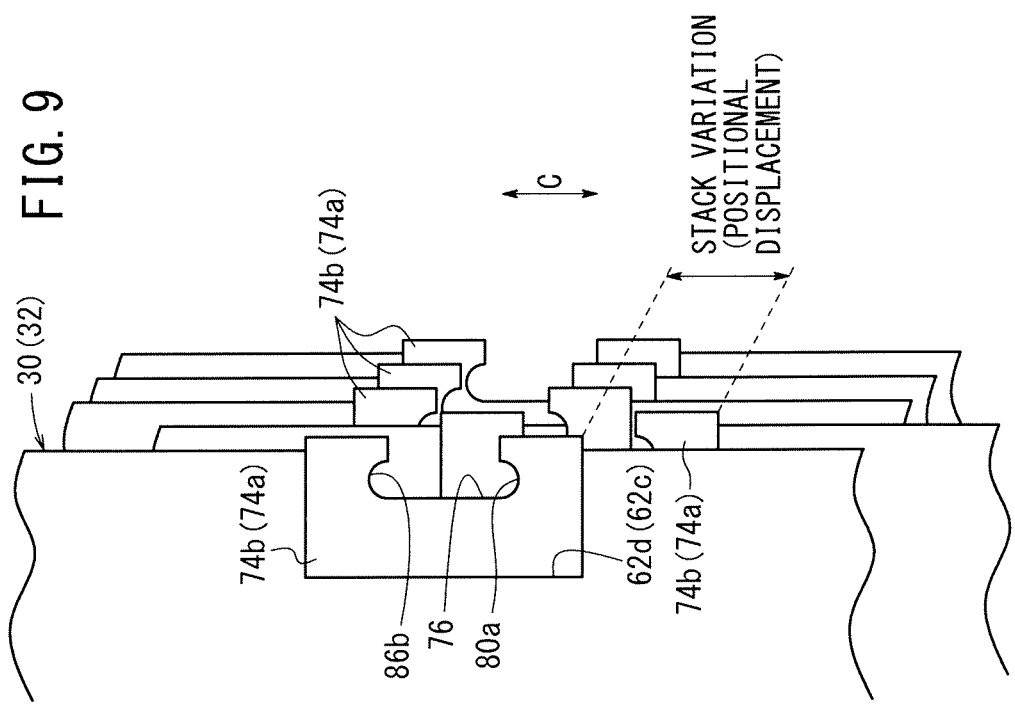
FIG. 9 is an enlarged perspective view showing main components by emphasizing positional displacement between recessed load receivers.

Also in the recessed load receivers 74a (74b), positional displacement of any of the recessed load receivers 74a (74b) relative to the other recessed load receivers 74a (74b) may occur, e.g., due to dimensional errors at the time of producing the first separator 30 and the second separator 32, or variation in the positions of the stacked components at the time of assembling the fuel cell stack 10. That is, as shown in FIG. 9, the end of the recessed load receiver 74a (74b) having the positional displacement protrudes beyond the ends of the other recessed load receivers 74a (74b). In FIG. 9, for ease of understanding, the protruding degree is emphasized.

In this state, assuming that an impact load is applied to the second tightening member 26, and as a result, the second tightening member 26 moves in the direction indicated by the arrow C1, the force in the direction indicated by the arrow C1 is firstly applied only to the end of the recessed load receiver 74a (74b) which protrudes beyond the other recessed load receivers 74a (74b). Stated otherwise, the force is locally concentrated on this end.

In this regard, in the embodiment of the present invention, as shown in FIG. 5, the second inner curves 80a, 80b extending to the first recess 76 are formed to provide sufficient flexibility of the recessed load receivers 74a (74b). Therefore, as shown by a virtual line in FIG. 5, the recessed load receiver 74a (74b) to which the force is applied firstly is deformed easily. As a result, the end of this recessed load receiver 74a (74b) is placed in alignment with the ends of the other recessed load receivers 74a (74b).

Therefore, thereafter, the force is received by a plurality of the ends that are placed in alignment with one another. Thus, the force is not concentrated on the single recessed load receiver 74a (74b), but distributed. Since the force applied to each of the ends becomes less than the withstand load of the recessed load receiver 74a (74b), it becomes possible to avoid damages of the recessed load receivers 74a (74b).

After all, in the embodiment of the present invention, the first inner curves 70a, 70b are formed in the projecting load receivers 64a (64b), and the second inner curves 80a, 80b are formed in the recessed load receivers 74a (74b) to increase flexibility of the projecting load receivers 64a (64b) and the recessed load receivers 74a (74b). Thus, even if variation in the positions of the stacked components is present between the plurality of projecting load receivers 64a (64b) and/or between the plurality of recessed load receivers 74a (74b), upon application of the force, the projecting load receives 64a (64b) are placed in alignment with one another, and the recessed load receivers 74a (74b) are placed in alignment with one another. Thus, it is possible to prevent concentration of the force on the projecting load receiver 64a (64b) or the recessed load receiver 74a (74b) having large positional displacement in comparison with the others, and it is possible to avoid the resulting damages of the projecting load receivers 64a (64b) and the recessed load receivers 74a (74b).

Further, in the embodiment of the present invention, the total modulus of elasticity ST1 of the positioning pins 88a, 88b is larger than the modulus of elasticity ST2 of the single cushioning member 104a, and the modulus of elasticity ST2 of the single cushioning member 104a is larger than the modulus of elasticity ST3 of the single first tightening member 24 (ST1>ST2>ST3). Likewise the total modulus of elasticity ST1 of the positioning pins 88a, 88b is larger than the modulus of elasticity ST2 of the single cushioning member 104b, and the modulus of elasticity ST2 of the single cushioning member 104b is larger than the modulus of elasticity ST3 of the single second tightening member 26 (ST1>ST2>ST3).

Therefore, curves of the positioning pins 88a, 88b can be absorbed by the cushioning members 104a, 104b, and it becomes possible to maintain the desired compression force applied to the cushioning members 104a, 104b by the first tightening members 24 and the second tightening members 26.

Thus, with simple and compact structure, it is possible to prevent positional displacement of the stacked unit cells 12, and suppress damages of the positioning pins 88a, 88b as much as possible.

In FIGS. 4 and 5, the first inner curves 70a, 70b and the second inner curves 80a, 80b are shown as cutouts in a semi-circular shape (i.e., the radius of curvature is constant). Alternatively, the radius of curvature on the side adjacent to the first separator 30 or the second separator 32 may be different from the radius of curvature on the side away from the first separator 30 or the second separator 32. Hereinafter, an embodiment regarding this structure will be described.

Figure 10:
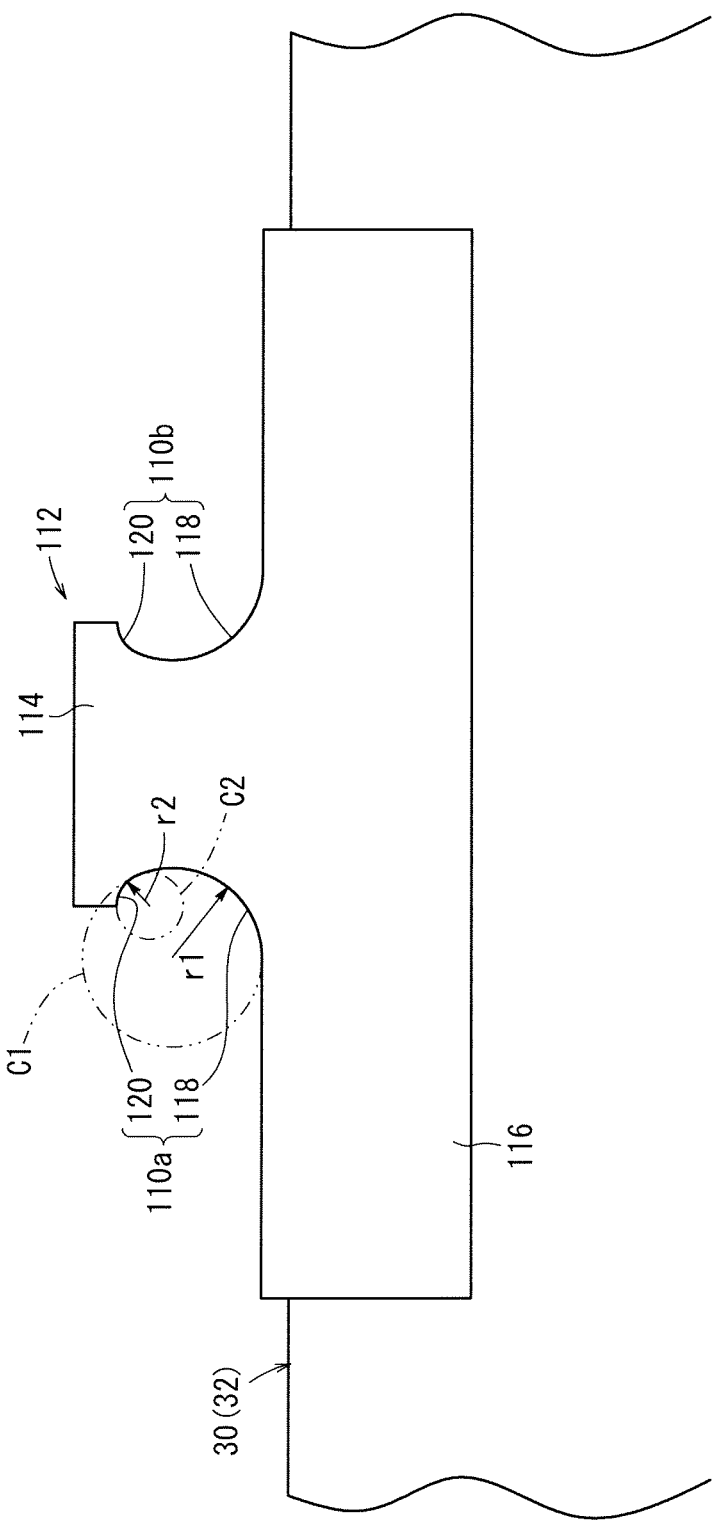
FIG. 10 is a front view schematically showing a projecting load receiver having inner curves as a whole where radius of curvature of the inner curves is different between a side adjacent to the separator and a side away from the separator.

FIG. 10 is a front view schematically showing a projecting load receiver 112 provided in the first separator 30 as a whole. The projecting load receiver 112 has first inner curves 110a, 110b. In this case, the radius of curvature of the first inner curves 110a, 110b is large on a side adjacent to the first separator 30, and small on a side away from the first separator 30.

More specifically, in the first inner curve 110a, a virtual circle C1 having a radius of r1 contacts a first curved portion 118 at the proximal end of a projection 114 (adjacent to the border between the projection 114 and a clip portion 116), and a virtual circle C2 having a radius of r2 contacts a second curved portion 120 at a wide front end of the projection 114. The radius r1 is larger than the radius r2 (r1>r2). Though not shown, the first inner curve 110b has the same structure. It is a matter of course that the projecting load receiver 112 may be provided in the second separator 32.

When a load is applied to the projecting load receiver 112 having the structure as described above, since the first inner curves 110a, 110b are formed such that the radius of curvature of the second curved portion 120 becomes smaller than the radius of curvature of the first curved portion 118, stress concentration tends to occur adjacent to the second curved portion 120, i.e., at the front end of the projection 114. Therefore, when the stress applied to the projecting load receiver 112 becomes excessive, cracks extending from the second curved portion 120 of the first inner curve 110a to the second curved portion 120 of the first inner curve 110b tend to be formed easily.

As a result, the projecting load receiver 112 is damaged firstly from its front end, and the clip portion 116 is not damaged easily. Therefore, it is possible to avoid exposure of the first separator 30 (or the second separator 32) through the clip portion 116.

In the structure, it is possible to avoid formation of an electrically conductive channel through the exposed position of the first separator 30, and thus, it is possible to maintain the desired insulating performance at the position covered by the clip portion 116.

The present invention is not limited to the above described particular embodiments, and various modifications can be made to the embodiments without departing from the gist of the invention.

For example, in the embodiments, the stack body 14 is formed by stacking the unit cells 12 each comprising a solid polymer electrolyte fuel cell. Alternatively, the stack body 14 may be formed by stacking unit cells each comprising a solid oxide fuel cell.

Further, as for the load receivers, only the projecting load receivers 64a, 64b may be provided, or only the recessed load receivers 74a, 74b may be provided.

What is claimed is:

1. A fuel cell stack formed by stacking a plurality of unit cells, the unit cells each including an electrolyte electrode assembly and a pair of separators sandwiching the electrolyte electrode assembly, the electrolyte electrode assembly including an anode, a cathode, and an electrolyte interposed between the anode and the cathode,
   wherein the separator includes a separator main body formed from a first material and a load receiver formed from a second material which is different from the first material, the load receiver attached to the separator main body for receiving a load in a direction perpendicular to a stacking direction of the unit cells;
   the load receiver is made of a flexibly resilient resin, and has either a projection protruding outwardly from an outer portion of the separator main body or a recess depressed inwardly from the outer portion of the separator main body; and
   the load receiver includes a clip portion for attaching to the separator main body, an outer portion having a first diameter and an intermediate portion interconnecting the outer portion and the clip portion, the intermediate portion having a second diameter which is smaller than the first diameter;
   wherein the intermediate portion includes a curved edge portion which is depressed to form an inner curve, and the inner curve of the load receiver provides flexibility in a direction perpendicular to the stacking direction.

2. The fuel cell stack according to claim 1, wherein a tightening member extending in the stacking direction to support the unit cells is engaged with at least one of the projection and the recess of the load receiver.

3. The fuel cell stack according to claim 1, wherein, in the case where the load receiver has the projection, radius of curvature of the inner curve is large on a side adjacent to the separator main body, and small on a side proximate the outer portion and away from the separator main body.

4. A fuel cell stack formed by stacking a plurality of unit cells, the unit cells each including an electrolyte electrode assembly and a pair of separators sandwiching the electrolyte electrode assembly, the electrolyte electrode assembly including an anode, a cathode, and an electrolyte interposed between the anode and the cathode,
   wherein the separator includes a separator main body and a load receiver attached to the separator main body for receiving a load in a direction perpendicular to a stacking direction of the unit cells;
   the load receiver is made of a flexibly resilient resin, and comprises a clip portion attached to the separator main body and a projection protruding outwardly from the clip portion, the projection including a head portion having a first diameter and a neck portion interconnecting the head portion and the clip portion, the neck portion having a second diameter which is smaller than the first diameter; and
   the neck portion is formed with an inner curve on each of two sides thereof, and the inner curve of the neck portion provides flexibility of the head portion in a direction perpendicular to the stacking direction.

5. A fuel cell stack formed by stacking a plurality of unit cells, the unit cells each including an electrolyte electrode assembly and a pair of separators sandwiching the electrolyte electrode assembly, the electrolyte electrode assembly including an anode, a cathode, and an electrolyte interposed between the anode and the cathode,
   wherein the separator includes a separator main body formed from a first material, and first and second load receivers formed from a flexibly resilient resin material which is different from the first material, the first and second load receivers attached to the separator main body for receiving a load in a direction perpendicular to a stacking direction of the unit cells;
   the first and second load receivers are made of a flexibly resilient resin, and the first load receiver has a projection protruding outwardly from an outer portion of the separator main body, and the second load receiver defines a recess depressed inwardly from the outer portion of the separator main body; and
   each of the first and second load receivers includes a clip portion for attaching to the separator main body, an outer portion having a first diameter and an intermediate portion interconnecting the outer portion and the clip portion, the intermediate portion having a second diameter which is smaller than the first diameter;
   wherein the intermediate portion includes a curved edge portion which is depressed to form an inner curve, and the inner curve of the load receiver provides flexibility in a direction perpendicular to the stacking direction.

* * * * *